United States Patent [19]
Iikawa et al.

[11] Patent Number: 5,884,110
[45] Date of Patent: Mar. 16, 1999

[54] AUTOMATIC DIAPHRAGM APPARATUS FOR LENS

[75] Inventors: Makoto Iikawa; Masashi Takahashi, both of Tokyo, Japan

[73] Assignee: Asahi Kogaku Kogyo Kabushiki Kaisha, Tokyo, Japan

[21] Appl. No.: 980,967

[22] Filed: Dec. 1, 1997

[30] Foreign Application Priority Data

Dec. 2, 1996 [JP] Japan .................................. 8-321729

[51] Int. Cl.$^6$ ........................................................ G03B 9/07
[52] U.S. Cl. ............................................................ 396/509
[58] Field of Search ................................... 396/505, 510, 396/509

[56] References Cited

U.S. PATENT DOCUMENTS

| | | | |
|---|---|---|---|
| 4,344,688 | 8/1982 | Metabi ..................................... | 396/509 |
| 4,464,040 | 8/1984 | Okura et al. . | |
| 5,250,971 | 10/1993 | Okura . | |
| 5,270,759 | 12/1993 | Okura . | |

*Primary Examiner*—W. B. Perkey
*Attorney, Agent, or Firm*—Greenblum & Bernstein, P.L.C.

[57] ABSTRACT

An automatic diaphragm apparatus in a lens in which an aperture diameter is varied in accordance with a set diaphragm value, set by a diaphragm set ring in a first section from the maximum aperture to a predetermined intermediate aperture. The aperture diameter is kept constant regardless of the set diaphragm value of the diaphragm set ring in a second section, from the predetermined intermediate aperture to the minimum aperture. The apparatus includes a diaphragm data transmission member in the form of an arc shape lever having one end which pivots on the diaphragm set ring at an offset position from the optical axis. On the other end, a diaphragm data transmission projection is provided. The apparatus also includes a cam mechanism which is provided between the diaphragm data transmission lever and an immovable portion of the lens. The cam mechanism is for holding the position of the diaphragm data transmission projection in a constant position when the diaphragm set ring is rotated in the first section. The cam mechanism is also for rotating the diaphragm data transmission projection together with the diaphragm set ring when the diaphragm set ring is rotated in the second section.

4 Claims, 4 Drawing Sheets

AUTOMATIC DIAPHRAGM APPARATUS FOR LENS

BACKGROUND OF THE INVENTION

1. Field of the Invention

The present invention relates to an automatic diaphragm apparatus for a lens which is mounted to a single lens reflex camera. More precisely, it relates to an apparatus for transmitting photometric data related to the diaphragm apparatus to a camera body.

2. Description of the Related Art

The assignee of the present application is also the assignee of U.S. Pat. No. 5,270,759 which discloses a automatic diaphragm apparatus of a lens system. In the automatic diaphragm apparatus, the size of an aperture varies in accordance with a set diaphragm value set by a diaphragm set ring when the set diaphragm value is in the range from the minimum diaphragm value (maximum aperture) to a predetermined intermediate diaphragm value. The size is kept constant regardless of the set diaphragm value when the set diaphragm value is in the range from the intermediate diaphragm value to the maximum diaphragm value (minimum aperture). In this automatic diaphragm apparatus, if the set diaphragm value is changed when the aperture is in the range from the minimum diaphragm value to a predetermined intermediate diaphragm value, a diaphragm effect (soft-focus effect) can be visibly confirmed through a view finder. On the other hand, in the range from the intermediate diaphragm value to the maximum diaphragm value, an automatic diaphragm function is obtained in which the stop-down to the set diaphragm value takes place immediately before the shutter releasing operation. Namely, in the diaphragm range where the field of view of the finder becoming dark should be avoided, the automatic diaphragm function can be obtained without the need for confirmation of the diaphragm effect. The "soft-focus effect" refers to effects caused by spherical aberrations of the lens and are attenuated by the stop-down operation of the diaphragm.

The assignee of the present application is also the assignee of U.S. Pat. No. 5,250,971 which discloses a photometric data transmitting apparatus in the automatic diaphragm apparatus. In the photometric data transmitting apparatus, data indicating the kind of the photometering system used and diaphragm data are transmitted to the camera body. Furthermore, the so-called stop-down metering is carried out in the range from the minimum diaphragm value (maximum aperture) to the intermediate diaphragm value. The so-called full-aperture metering is carried out in the range from the intermediate diaphragm value to the maximum diaphragm value (minimum aperture), respectively. To this end, a diaphragm association member (diaphragm data transmitting member) is provided to transmit the diaphragm data to the camera body, in addition to the diaphragm set ring.

Also, an association mechanism is provided between the diaphragm set ring and the diaphragm association member. the association mechanism retains the diaphragm association member in a predetermined position regardless of the angular position of the diaphragm set ring in the range in which the size of the open aperture changes. The association mechanism also rotates the diaphragm association member together with the diaphragm set ring in the range in which the size of the open aperture does not change.

In the association mechanism, an association spring is provided between the diaphragm set ring and the diaphragm association member to bias the diaphragm set ring and the diaphragm association member in opposite directions. However, the tensile force of the association spring varies depending on the angular position (set diaphragm value) of the diaphragm set ring. Hence the rotational torque of the diaphragm set ring (diaphragm operation ring) is not constant. The click force to click the diaphragm set ring (diaphragm operation ring) at the set diaphragm value must be large enough to resist the maximum biasing force of the association spring. Consequently, a large operational force is necessary resulting in a bad operational perception.

SUMMARY OF THE INVENTION

It is an object of the present invention to provide an automatic diaphragm apparatus having a photometric data transmitting apparatus in which the size of the open aperture varies in accordance with the set diaphragm value. The variance is in the range from the maximum aperture (minimum diaphragm value) to a predetermined intermediate aperture set by the diaphragm set ring. The open aperture is kept constant in the range from the predetermined intermediate aperture to the minimum aperture (maximum diaphragm value), regardless of the set diaphragm value by the diaphragm set ring. The transmission of information on the stop-down metering and the full-aperture metering from the lens side to the camera body side are automatically carried out. Thus a good operational perception feeling can be obtained without providing a spring means between the diaphragm set ring and the diaphragm data transmission member.

To achieve the object mentioned above, according to the present invention, there is provide an apparatus for transmitting photometric data in a lens in which an aperture diameter is varied in accordance with the diaphragm value set by a diaphragm set ring in a first section from the maximum aperture to a predetermined intermediate aperture. The aperture diameter is kept constant regardless of the set diaphragm value of the diaphragm set ring in a second section from the predetermined intermediate aperture to the minimum aperture. The apparatus for transmitting photometric data to the camera body comprises a diaphragm data transmission member, an association mechanism and a cam mechanism. The diaphragm data transmission member is separate from the diaphragm set ring, and is for transmitting diaphragm data to the camera body. The association mechanism is between the diaphragm set ring and the diaphragm data transmission member, for keeping the diaphragm data transmission member in a constant position regardless of the angular position of the diaphragm set ring in the first section, in which the aperture can be varied. The transmission member is also rotating the diaphragm data transmission member together with the diaphragm set ring in the second section in which no aperture can be varied. The diaphragm data transmission member is comprised of a diaphragm data transmission lever of an arc shape. One end of the lever pivots on the diaphragm set ring at an offset position from the optical axis. The other end is provided with a diaphragm data transmission projection. The cam mechanism is provided between the diaphragm data transmission lever and an immovable portion of the lens. The cam mechanism is for holding the position of the diaphragm data transmission projection in a constant position when the diaphragm set ring is rotated in the first section, in which the aperture can be varied. The cam mechanism is also for rotating the diaphragm data transmission projection, together with the diaphragm set ring when the diaphragm set ring is rotated in the second section in which no aperture can be varied.

The cam mechanism can be comprised of a cam groove provided on the diaphragm data transmission lever and a posture control pin which is provided at an immovable portion of the lens and which is fitted in the cam groove. The cam groove can be composed of a non-arc section corresponding to the first section in which the aperture can be varied and an arc section whose center is located on the optical axis. The non-arc section corresponds to the second section in which no aperture can be varied.

Preferably, the diaphragm set ring is provided with an arc-shape groove having a center is located on the optical axis, so that the posture control pin is fitted in both the arc-shape groove and the cam groove of the diaphragm data transmission lever.

The present disclosure relates to subject matter contained in Japanese Pat. Application No. 08-321729 (filed on Dec. 2, 1996) which is expressly incorporated herein by reference in its entirety.

BRIEF DESCRIPTION OF THE DRAWINGS

The invention will be discussed below in detail with reference to the accompanying drawings; in which.

DESCRIPTION OF THE PREFERRED EMBODIMENT

Figure 1:
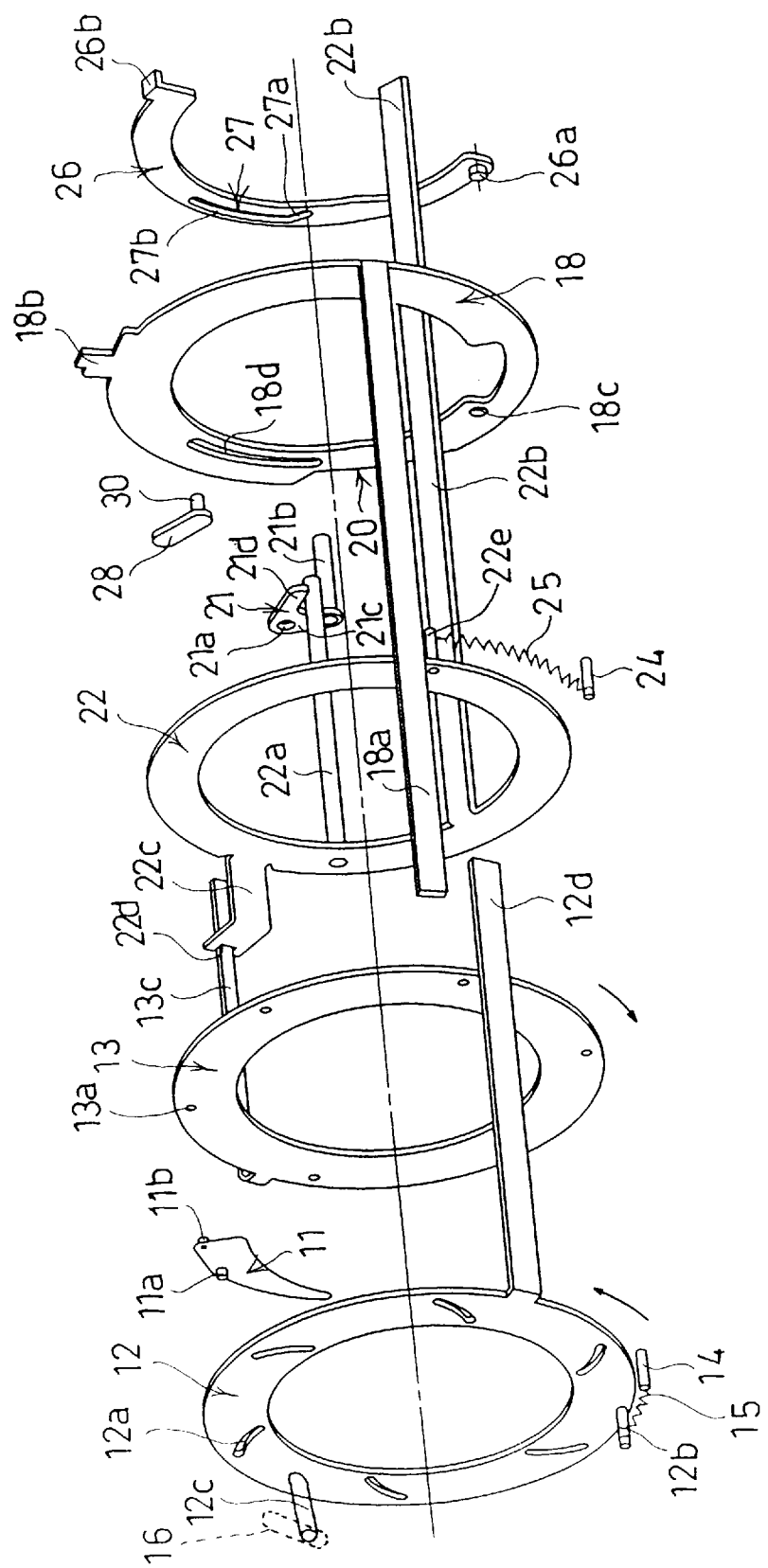
FIG. 1 is an exploded perspective view of an apparatus for transmitting photometric data of a lens according to an embodiment of the present invention.

In FIG. 1, a diaphragm mechanism includes a plurality of diaphragm blades, but only one diaphragm blade 11 is shown in FIG. 1. The diaphragm blade 11 is provided on the front and back surfaces thereof with projections 11a and 11b. The diaphragm blade 11 is held between a diaphragm support ring 12 and a diaphragm closing and opening ring 13. The diaphragm support ring 12 and the diaphragm closing and opening ring 13 are relatively and respectively rotatable. The projections 11a and 11b of the diaphragm blades 11 are fitted in cam grooves 12a formed in the diaphragm support ring 12 and holes 13a formed in the diaphragm closing and opening ring 13. The cam profile of the cam grooves 12a is such that when a relative rotation between the diaphragm support ring 12 and the diaphragm closing and opening ring 13 occurs, the aperture defined by the diaphragm blades 11 is closed or opened.

The stop-down direction of the diaphragm support ring 12 and the diaphragm closing and opening ring 13 is indicated by arrows in FIG. 1. The diaphragm support ring 12 is biased into the stop-down direction by a tensile spring 15 which is provided between a spring engagement pin 12b provided on the diaphragm support ring 12 and a spring engagement pin 14 provided on a stationary lens portion (stationary portion of a lens barrel). The diaphragm support ring 12 is provided with a rotation restriction pin 12c which extends in the forward direction parallel with the optical axis and an association projection (arm) 12d which extends in the rearward direction opposite to that of the rotation restriction pin 12c. The rotation restriction pin 12c is fitted in a rotation restriction groove 16 formed in the stationary portion of the barrel. The association arm 12d can be engaged with a restriction projection (arm) 18a, which extends in a direction parallel with the optical axis, of a diaphragm set ring (cam ring) 18.

The diaphragm opening and closing ring 13 is provided with a driven projection 13c which extends in a rearward direction parallel with the optical axis toward the release ring 22.

Figure 5:
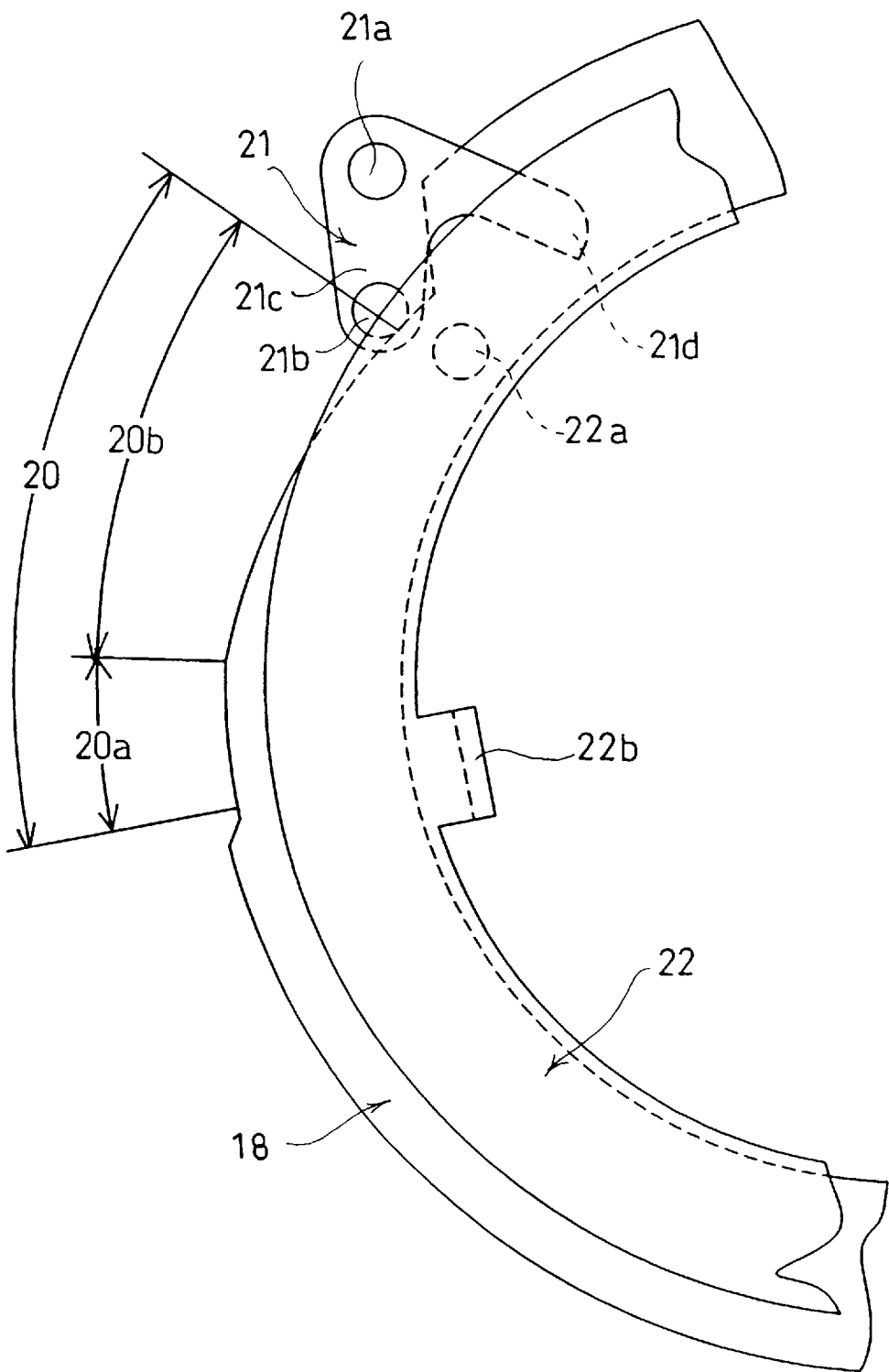
FIG. 5 is a front elevational view of a cam mechanism of an automatic diaphragm apparatus.

The diaphragm set ring (cam ring) 18 rotates together with a diaphragm operation ring, i.e., a diaphragm scale ring (not shown) which can be externally actuated through a radial projection 18b. The cam ring 18 is provided on the outer peripheral surface with a cam surface 20 which is provided with a stop-down section 20a and an automatic diaphragm section 20b (FIG. 5). The stop-down section 20a is part of a circle having a constant radius and corresponds to a diaphragm range from the maximum aperture (minimum F number, e.g., F2) to a predetermined intermediate diaphragm value (e.g., F4). The automatic diaphragm section 20b is defined by a cam surface in which the radius is gradually reduced from the stop-down section 20a corresponding to the diaphragm range from the intermediate diaphragm value to the minimum aperture (maximum F number). The restriction projection 18a presses the association projection 12d against the tensile spring 15 when the diaphragm set ring 18 is in a diaphragm full-opening position. The restriction projection 18a is kept in contact with the association projection 12d until the diaphragm set ring 18 comes to a predetermined position corresponding to an intermediate diaphragm value.

A cam follower (pin) 21b abuts against the cam surface 20 of the cam ring 18. The cam follower 21b is provided on one of legs 21c of a generally V-shaped intermediate lever 21 which is pivoted to an immovable portion of the lens barrel by means of a shaft 21a. The other leg 21d of the intermediate lever 21 abuts against a stop pin 22a provided on the release ring 22 and forms a stop leg which restricts the maximum angular displacement (angular extremity) of the release ring 22.

The release ring 22 is equipped with a body association lever 22b which extends rearward parallel with the optical axis and an opening and closing ring association lever 22c which extends forward in a direction opposite to the body association lever 22b. The opening and closing ring association lever 22c is provided with a bifurcated portion 22d in which the driven projection 13c of the diaphragm set ring 13 is engaged. The release ring 22 is biased to rotate in the stop-down direction by a tensile spring 25 which is connected at one end to a spring engagement pin 22e provided on the release ring 22 and at the other end to a spring engagement pin 24 provided on the immovable portion of the lens barrel, respectively. Consequently, the diaphragm opening and closing ring 13 is biased in the same direction as the release ring 22. The body association lever 22b abuts against a diaphragm drive member (not shown) of the camera body when the lens is mounted to the camera body, so that the release ring 22 is rotated in a direction to loosen the tensile spring 25 to a position where the diaphragm is full-open and is held in that position. The diaphragm drive member of the camera body is retracted to a disengagement position in which the diaphragm drive member is disengaged from the body association lever 22b prior to the shutter release operation.

The diaphragm set ring 18 is provided on the lower portion thereof (in FIGS. 1 and 2) with a hole 18c in which the diaphragm data transmission lever 26 is rotatably fitted. The position of the hole 18c is offset from the optical axis. The diaphragm data transmission lever 26 of a substantially semicircular shape provided behind the diaphragm set ring 18, is provided on one end with a projection (shaft) 26a which is rotatably fitted in the hole 18c of the cam ring 18. The diaphragm data transmission lever 26 is provided on the other end thereof with diaphragm data transmission projection 26b which is adapted to discriminate the stop-down metering or the full-aperture metering and transmit the diaphragm value upon the full-open metering to the camera body. In the illustrated embodiment, the angular distance between the shaft 26a and the diaphragm data transmission projection 26b is set at approximately 180°.

Figure 2:
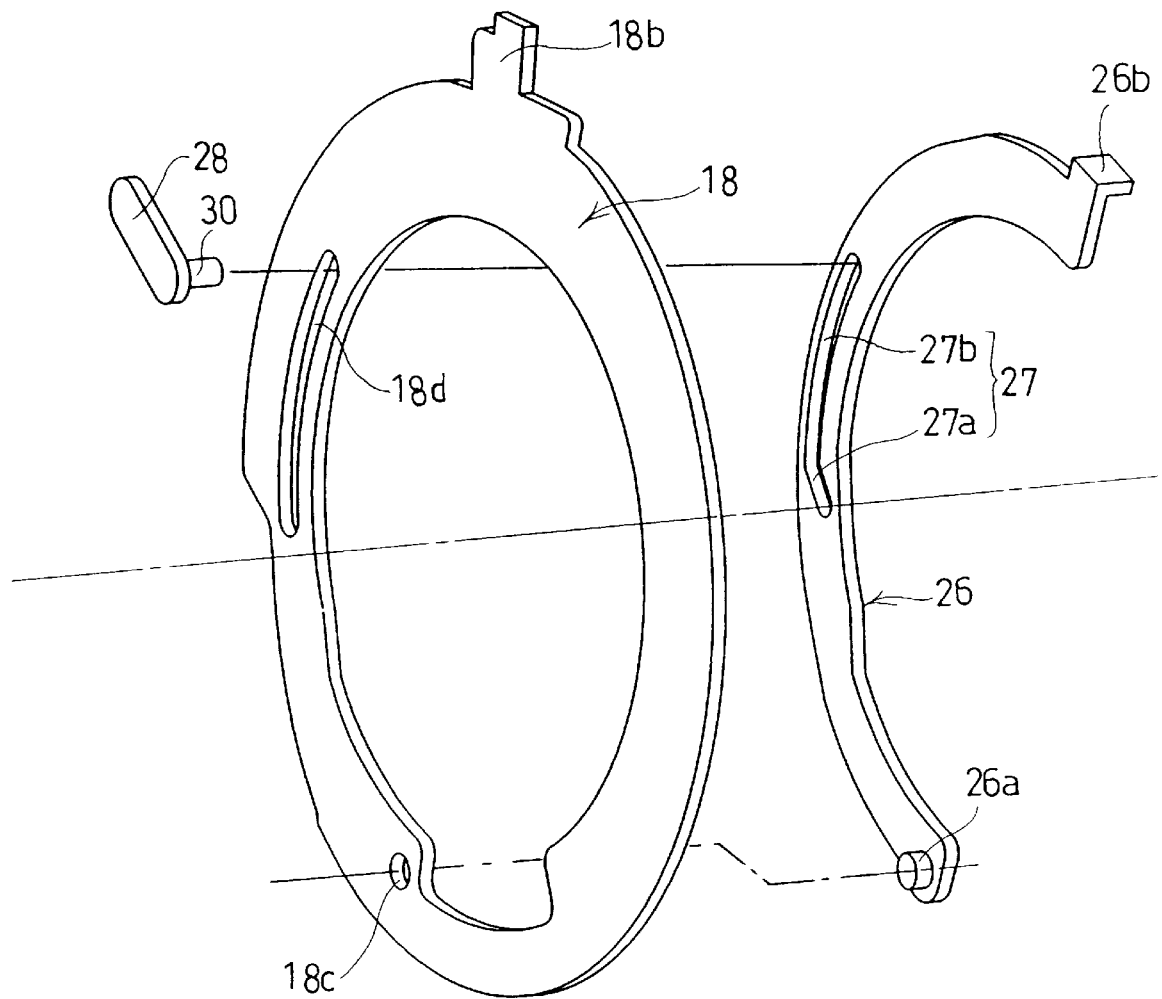
FIG. 2 is an exploded perspective view of a diaphragm set ring, diaphragm data transmission lever and a posture control pin in a photometric data transmitting apparatus shown in FIG. 1.
Figure 3:
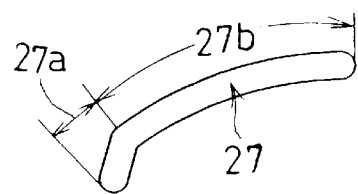
FIG. 3 is a plan view of a cam groove of a diaphragm data transmission lever.

The diaphragm data transmission lever 26 is equipped with a cam groove 27 at the center portion between the shaft 26a and the diaphragm data transmission projection 26b. As shown in FIGS. 2 and 3, the cam groove 27 has a non-arc (non-circular) section 27a and an arc (circular) section 27b having a center located on the optical axis. A posture control pin 30, provided at a front end of the lever 28 which constitutes the immovable portion of the lens barrel is fitted in the cam groove 27. The posture control pin 30 is fitted in the cam groove 27 from the side of the diaphragm set ring 18. To this end, the diaphragm set ring 18 is provided with an arc-shaped groove 18d having a center located on the optical axis, so that the pin 30 extends through an arc-shaped groove 18d.

The profile of the non-arc section 27a of the cam groove 27 is such that when the diaphragm set ring 18 rotates. It rotates within the stop-down section 20a of the cam surface 20, the diaphragm data transmission lever 26 swings or rotates. It rotates about the shaft 26a through the posture control pin 30 to prevent the diaphragm data transmission projection 26b from moving when the shaft 26a of the diaphragm data transmission lever 26 moves together with the diaphragm set ring 18. The profile of the arc section 27b is such that when the diaphragm set ring 18 rotates within the auto diaphragm section 20b of the cam surface 20, the angular displacement of the shaft 26a of the diaphragm set lever 26 together with the diaphragm set ring 18 (the hole 18c) causes the same angular displacement of the diaphragm data transmission projection 26b. In other words, no swing movement or rotation of the diaphragm data transmission lever 26 takes place. There is no spring between the diaphragm set ring 18 and the diaphragm data transmission lever 26 to control the position of the diaphragm data transmission projection 26b as mentioned above.

The apparatus of the present invention operates as follows.

When the diaphragm set ring 18 is set in a full-open aperture position (corresponding to F2 FIG. 4), the restriction projection 18a of the diaphragm set ring 18, having whose rotational movement is the same as that of the diaphragm operation ring presses the association projection 12d of the diaphragm support ring 12 fully, so that the diaphragm support ring 12 is held in a full-open position corresponding to the full-open aperture. When the diaphragm set ring 18 is rotated from the full-open position to the predetermined intermediate position (corresponding to F4), the diaphragm support ring 12 is rotated in the stop-down direction by the spring force of the tensile spring 15 in accordance with the rotation of the restriction projection 18a. Namely, the aperture defined by the plural diaphragm blades 11 is reduced and the stop-down state can be confirmed through the finder.

In the stop-down section, the cam follower pin 21b of the intermediate lever 21 comes into contact with the stop-down section (uniform diameter section) 20a of the cam surface 20 of the cam ring 18. Therefore, no rotation of the intermediate lever 21 occurs, so that the stop leg 21d and the stop pin 22a of the release ring 22 are kept in contact with each other. Thus, when the shutter is released in the stop-down section, the diaphragm driven member of the camera body is disengaged from the body association lever 22b, so that neither the release ring 22 nor the diaphragm opening and closing ring 13 rotate.

Figure 4:
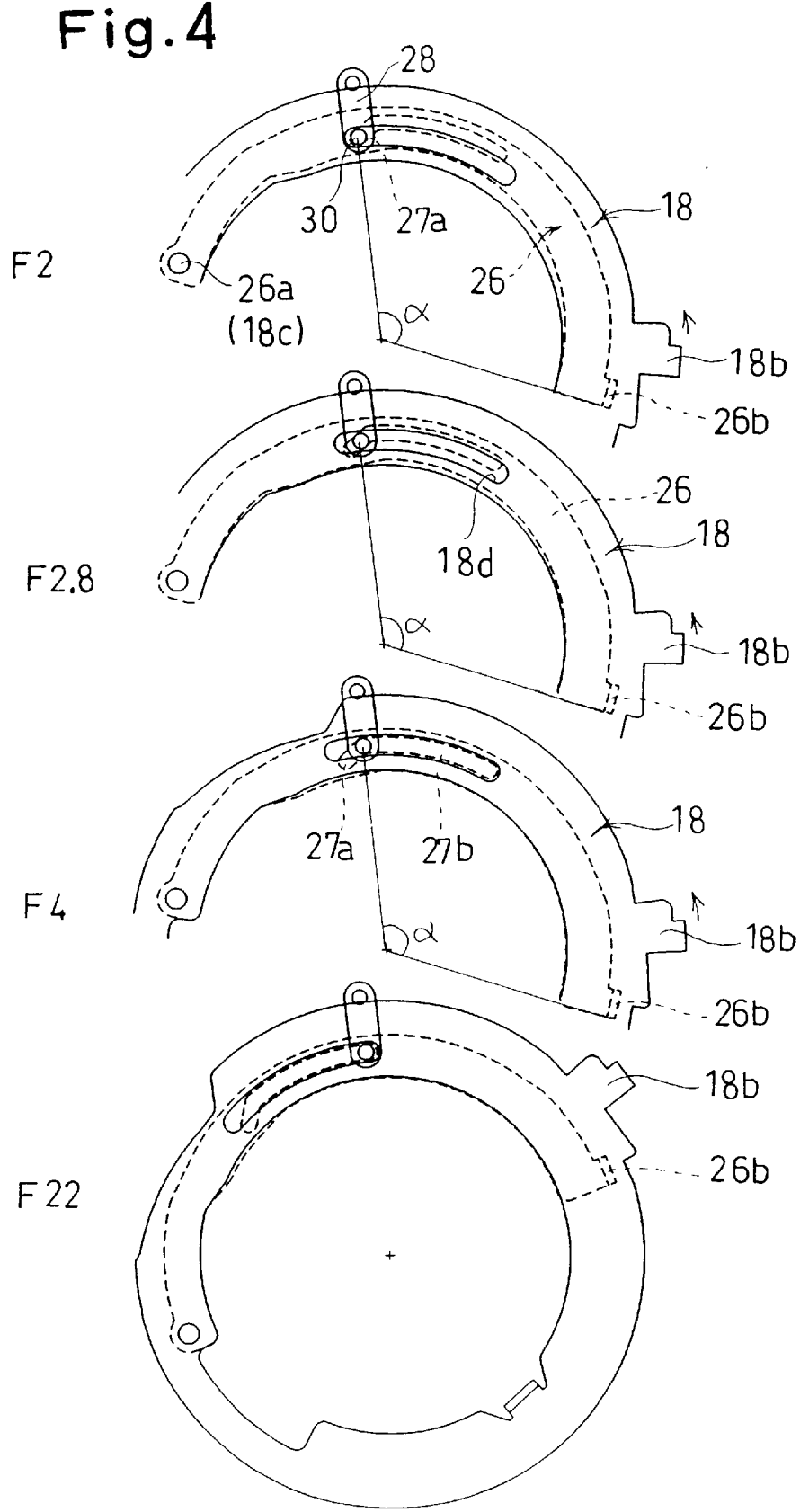
FIG. 4 is a front elevational view of a diaphragm set ring and a diaphragm data transmission lever, and shows to show the relationship between the angular position of the diaphragm set ring and the movement of the diaphragm data transmission lever.

In the stop-down section (in which the aperture diameter is varied due to the rotation of the diaphragm set ring 18), the rotation of the diaphragm set ring 18 in the stop-down direction causes the shaft 26a of the diaphragm data transmission lever 26 to move in the same direction. Because the posture control pin 30 is fitted in the non-arc shape section 27a of the cam groove 27 formed in the diaphragm data transmission lever 26, the data transmission lever 26 rotates or swings about the shaft 26a to prevent the diaphragm data transmission projection 26b from moving in accordance with the rotation of the diaphragm set ring 18. In FIG. 4, "F2", "F2.8", and "F4" show the angular positions of the diaphragm set ring 18 and the angular positions (swing positions) of the diaphragm data transmission lever 26 in the stop-down section. As shown, the angular positions of the diaphragm data transmission projection 26b, i.e., the angle α defined between the posture control pin 30 and the diaphragm data transmission projection 26b does not vary. Hence, the signal which indicates that the stop-down metering should be carried out is transmitted to the camera body, based on the position of the diaphragm data transmission projection 26b. Note that it is practically possible to carry out the stop-down received light caused by the change in the diameter of the aperture without generating a special signal for the stop-down down metering operation in accordance with the position of the diaphragm data transmission projection 26b. Namely, no movement of the diaphragm data transmission projection 26b is required in the stop-down operation. Also it is not always necessary to obtain special stop-down metering information directly from no movement of the diaphragm data transmission projection.

When the diaphragm set ring 18 reaches the predetermined intermediate diaphragm position ( F4 ), the rotation restriction pin 12c of the diaphragm support ring 12 abuts against the end of the rotation restriction groove 16, so that no further rotation of the diaphragm support ring 12 occurs in the stop-down direction. Further rotation of the diaphragm set ring 18 toward the small aperture position (maximum F number) causes the cam follower pin 21b of the intermediate lever 21 to engage with the auto diaphragm section 20b of the cam surface 20. Consequently, the intermediate lever 21 is rotated in accordance with the profile of the auto diaphragm section 20b of the cam surface 20 to vary the position of the stop leg 21d of the intermediate lever. Namely, the stop leg 21d is not in contact with the stop pin 22a of the release ring 22. In this state, when the shutter is released, the diaphragm drive member of the camera body is disengaged from the body association lever 22b. Consequently, the release ring 22 and the diaphragm opening and closing ring 13 are rotated in the stop-down direction by the spring force of the tensile spring 25. The angular displacement of the diaphragm opening and closing ring 13 is restricted by the stop pin 22a which abuts against the stop leg 21d. Hence the aperture upon shutter releasing is identical to a set diaphragm value.

When the diaphragm set ring 18 comes to a position corresponding to the predetermined intermediate diaphragm value (F4), the posture control pin 30 is moved from the non-arc shape section 27a into the arc-shape section 27b. Since the arc-shape section 27b is defined by an radius having a center located on the optical axis, the rotation of the diaphragm set ring 18 in the stop-down direction does not cause the swing movement of the diaphragm data transmission lever 26 about the shaft 26a. Consequently, the diaphragm data transmission projection 26b is rotated together with the diaphragm set ring 18, so that the position thereof changes in accordance with the set diaphragm value. The transfer carried out between "F4" and "F22" in FIG. 4, is a transfer section in which the diaphragm data transmission projection 26b moves. Namely, when the diaphragm data transmission projection 26b enters the transfer section, the signal which represents indicates that the full-aperture metering should be carried out is issued. Then, the diaphragm data set by the diaphragm set ring 18, based on the position of the diaphragm data transmission projection 26b, is transmitted to the camera body.

No spring force is used to control the position of the diaphragm data transmission projection 26b in accordance with the rotation of the diaphragm set ring 18 mentioned above. Therefore, the resistance to the rotation of the diaphragm set ring 18 is not increased (or decreased) or does not change depending on the position of the diaphragm set ring 18. Thus, a good operational perception can be obtained.

The automatic diaphragm apparatuses in which the normally opened diaphragm are varied to obtain a set diaphragm value upon shutter releasing and the cam mechanisms thereof, are known in the art. The cam mechanism in the illustrated embodiment is a non-limiting example and any type of cam mechanisms for the automatic diaphragm apparatus can be used in the present invention.

Although the posture control pin 30 is provided in front of the diaphragm set ring 18 which is in turn provided in front of the diaphragm data transmission lever 26 in the illustrated embodiment, it is possible to provide the posture control pin 30 behind the diaphragm data transmission lever 26. In this alternative, case the arc-shape groove 18d of the diaphragm set ring 18 can be dispensed with.

As can be understood from the above discussion, according to the present invention, in an automatic diaphragm apparatus of a lens in which the aperture is varied in accordance with a set diaphragm value of a diaphragm set ring, in a first section from the maximum aperture (minimum F number) to a predetermined intermediate aperture, and is kept constant in a second section, from the predetermined intermediate aperture to the minimum aperture (maximum F number), regardless of the set diaphragm value of the diaphragm set ring, the diaphragm data transmission projection is not moved. It is held in a specific position in the first section from the maximum aperture to the predetermined intermediate aperture. Consequently, the signal for the stop-down metering can be transmitted to the camera body. In the second section from the predetermined intermediate aperture to the minimum aperture, the diaphragm data transmission projection is moved together with the diaphragm set ring, so that the signal for the full-aperture metering and the set diaphragm value can be transmitted to the camera body. Furthermore, according to the present invention, because the diaphragm data transmission lever provided with the diaphragm data transmission projection is pivoted on the diaphragm set ring at an offset position (eccentric from the center axis thereof) and the position of the diaphragm data transmission projection is controlled by the cam mechanism, the operational force of the diaphragm set ring does not change. Moreover is an increased operational force is not necessary.

What is claimed is:

1. In an automatic diaphragm apparatus in a lens in which an aperture diameter is varied in accordance with a set diaphragm value set by a diaphragm set ring in a first section, from the maximum aperture to a predetermined intermediate aperture, and is kept constant regardless of the set diaphragm value of the diaphragm set ring in a second section, from the predetermined intermediate aperture to the minimum aperture, said automatic diaphragm apparatus comprising:

a diaphragm data transmission member for transmitting photometric data to a camera body, said diaphragm data transmission member being an arc shaped diaphragm data transmission lever having one end which pivots on the diaphragm set ring at an offset position from the optical axis, and which is provided on another end with a diaphragm data transmission projection;

an association mechanism between the diaphragm set ring and the diaphragm data transmission member, for keeping the diaphragm data transmission member in a constant position regardless of the angular position of the diaphragm set ring in the first section, and for rotating the diaphragm data transmission member together with the diaphragm set ring in the second section; and a cam mechanism provided between the diaphragm data transmission lever and an immovable portion of the lens, for holding the position of the diaphragm data transmission projection in a constant position when the diaphragm set ring is rotated in the first section and for rotating the diaphragm data transmission projection together with the diaphragm set ring when the diaphragm set ring is rotated in the second section.

2. The automatic diaphragm apparatus according to claim 1, wherein said cam mechanism further comprises a cam groove provided on the diaphragm data transmission lever and a posture control pin provided at an immovable portion of the lens and which is fitted in the cam groove.

3. The automatic diaphragm apparatus according to claim 2, wherein said cam groove is composed of a non-arc section corresponding to the first section and an arc section having a center located on the optical axis and which corresponds to the second section.

4. The automatic diaphragm apparatus according to claim 2, wherein said diaphragm set ring is provided with an arc-shape groove having a located on the optical axis, so that the posture control pin is fitted in the arc-shape groove and the cam groove of the diaphragm data transmission lever.

* * * * *